United States Patent Office.

FRITZ ACH AND LORENZ ACH, OF MANNHEIM, GERMANY, ASSIGNORS TO C. F. BOEHRINGER & SOEHNE, OF WALDHOF, GERMANY.

FORMIC ALDEHYDE COMPOUND OF URIC ACID AND PROCESS OF MAKING SAME.

SPECIFICATION forming part of Letters Patent No. 654,123, dated July 24, 1900.

Application filed April 21, 1898. Serial No. 678,331. (Specimens.)

*To all whom it may concern:*

Be it known that we, FRITZ ACH and LORENZ ACH, citizens of the German Empire, residing at Mannheim, Germany, have invented certain new and useful Improvements in Formic Aldehyde Compounds of Uric Acids and Process of Making the Same; and we do hereby declare the following to be a full, clear, and exact description of the invention, such as will enable others skilled in the art to which it appertains to make and use the same.

This application relates to the art of preparing compounds of formic aldehyde and uric acids; and the present invention extends to such combinations of formic aldehyde not only with uric acid proper, but to homologues or alkyl derivatives of the same, all of which are classed under the generic designation "uric acids." We have found that a product of consolidation may be formed from uric acids and formic aldehydes in which one molecule of the acid has combined with one molecule only of the formic aldehyde. This new class of compounds is obtained by, and our invention for this purpose consists in, causing formic aldehyde to act upon a uric acid, in combination with alkali, either in the form of an alkaline solution of the acid or an alkali salt of the same. This reaction appears to result generally whether the uric acid proper or alkylized uric acids be employed. We have thus far obtained such consolidation products with formic aldehyde from uric acid proper, 3-monomethyl-uric acid, 7-monomethyl-uric acid, 9-monomethyl-uric acid, and 1-3-dimethyl-uric acid. In these new addition products the carbonatom of the formic aldehyde is directly bound to a nitrogenatom of the uric acid, and it is probable that an oxymethylene compound has been formed according to the following scheme:

$$R.NH + CH_2O = R.N.CH_2.OH.$$

That a nitrogen-carbon combination is effected is established by the fact that the new bodies obtained under the present invention are readily and smoothly converted into alkylized uric acids by reducing methods:

$$R.N.CH_2.OH + H_2 = R.N.CH_3 + H_2O.$$

Each of these oxymethylene-uric acids formed by the union of uric acids and formic aldehyde easily split off formic aldehyde on boiling them with water, dilute mineral acids, or alkalies, the corresponding uric acids being regenerated. So far as they still contain free imido groups they may be readily further alkylized. These new compounds are to be employed as medicines or drugs or as starting materials in the preparation of medicines or drugs.

In order to fully disclose our invention, which consists in the treatment of uric acid combined with an alkali either in the form of an alkaline solution or an alkali salt of the uric acid with formic aldehyde in the products of such treatment and in such further features as will be pointed out in the claims, we will now illustrate the same by describing a number of examples embodying what we consider the preferable manner of carrying the same into effect. The proportions given are all understood to be by weight.

I. *Preparation of oxymethylene-uric acid.*— One part of uric acid proper is dissolved in fifteen parts of water, together with one part (corresponding to two and one-half molecules) of caustic potash of eighty per cent. strength, while gently warming. The solution is then allowed to cool to room temperature, and there are then added thereto 1.6 parts of concentrated solution of formic aldehyde. The whole is then allowed to stand at room temperature. After the lapse of several hours (for about twenty to twenty-five hours) the still clear solution is acidulated with HCl and treated with animal or other charcoal for purification and decoloration, this action being hastened by shaking the whole after the charcoal or bone-black has been introduced, or such decolorizing agent may be employed as a filter in a manner well known. After filtering the liquor the colorless filtrate is allowed to stand, when the oxymethylene-uric acid will be thrown out in the form of coarse shining prismatic crystals, which are then cleaned by washing with alcohol and ether and drying on the water-bath. The analysis of these crystals gives figures corresponding to the formula $C_6H_6N_4O_4 + H_2O$, or

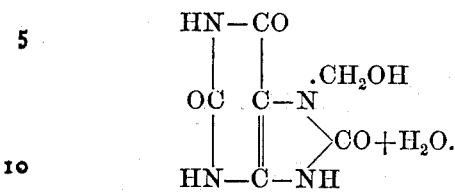

The water of crystallization is slowly driven off by heating for a longer period at a temperature of from 120° to 130° centigrade. The oxymethylene-uric acid, like uric acid proper, gives a strong murexid test with nitric acid or chlorin water and reduces ammoniacal-silver solution in the cold.

The new product has no melting-point, but turns brown when heated beyond 320° centigrade and is decomposed at a still higher temperature, the decomposition being attended with darkening and frothing. It is readily recrystallized from water by boiling a short time after adding it thereto. It is thus obtained in the form of fine acicular crystals or short colorless prisms. On protracted boiling with water formaldehyde is split off and the uric acid proper regenerated.

Oxymethylene-uric acid is readily soluble in dilute alkalies. Concentrated alkali lyes precipitate the corresponding salts after a short time in the form of colorless needles united to form globular aggregates.

The potassium salt of oxymethylene-uric acid may readily be obtained from crystallized acid urate of potassium if the latter is added to five times its weight of concentrated solution of formic aldehyde and the whole allowed to remain together for a considerable period of time—say about thirty to forty hours—the whole being preferably shaken or agitated. The excess of formaldehyde solution is then removed by siphoning, decanting, or otherwise and then washing with alcohol. From the potassium salt so obtained the above-described oxymethylene-uric acid is obtained by supersaturating with mineral acids.

II. *Preparation of 3-methyl-oxymethylene-uric acid.*—We take one part of 3-monomethyl-uric acid and add thereto 1.8 parts of potash lye (potassium hydrate) of twenty per cent. strength and one part of concentrated solution of formic aldehyde and shake the whole until a clear solution results, which occurs in short time. After allowing this solution to stand for about fifteen to twenty hours at room temperature the liquor is acidulated with hydrochloric acid. The crystallization of the 3-methyl-oxymethylene-uric acid in the form of colorless crystals begins. After cooling the mass for several hours with ice-water the liquor is removed from the crystals by decanting, siphoning, or the like. The analysis of the crystalline powder so obtained after being dried in an exsiccator or in any suitable manner gives figures corresponding to the formula $C_7H_8N_4O_4$, or

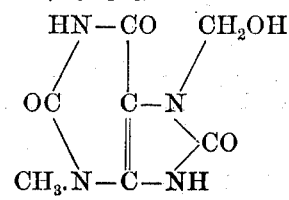

This new compound is readily soluble in boiling water, crystallizing therefrom in the form of colorless prisms, for the most part aggregated in druses or nodules. On boiling for a longer period formaldehyde escapes and 3-methyl-uric acid is regenerated. It possesses no melting-point, but is decomposed between 310° and 320° centigrade, this action being accompanied by darkening and effervescence or frothing. It gives the murexid test and reduces ammoniacal-silver solution even when gently heating. 3-methyl-oxymethylene-uric acid is readily soluble in dilute alkalies, including ammonia, and also in fuming hydrochloric acid.

III. *Preparation of 1-3-dimethyl-oxymethylene-uric acid.*—We pour over one part of 1-3-dimethyl-uric acid 3.5 parts, by volume, of double normal potash lye. This causes solution of the acid. After a short time, however, the whole congeals to a pulp or mass of fine acicular crystals consisting of the potassium salt of the 1-3-dimethyl-uric acid. One part of concentrated solution of formic aldehyde is now added, which rapidly results in the formation of a clear solution. This solution is allowed to stand, and after some time the potassium salt of the 1-3-dimethyl-oxymethylene-uric acid is separated as a colorless crystalline mass consisting of small needles aggregated into globular masses. After allowing this crystalline mass to stand for about thirty hours the liquor is drawn off therefrom and the crystalline mass is dissolved in water and acidulated with hydrochloric acid. The crystallization of the free 1-3-dimethyl-oxymethlene-uric acid in the form of colorless fine needles then begins. After cooling the mass for several hours with ice-water the liquor is drawn off from the crystals by siphoning, decanting, or otherwise. An analysis of these crystals after being dried by means of the exsiccator gives figures corresponding to the formula $C_8H_{10}N_4O_4$, or, structurally,

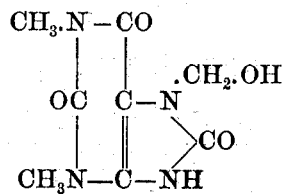

This new acid is soluble in water with tolerable ease and crystallizes therefrom in the form of colorless short prisms. On boiling with water formic aldehyde is quickly split off, 1-3-dimethyl-uric acid being regenerated. The new product is, moreover, soluble in dilute alkalies, including ammonia, and also in concentrated hydrochloric acid. It has no melting-point; but on boiling to over 300° centigrade it is gradually decomposed, the decomposition being attended by darkening.

When employing the alkylized uric acids as starting materials, the corresponding oxymethylene compounds may also be obtained, if the formic aldehyde be added to a neutral instead of an alkaline solution of such alkyl-uric acid. For these uric acids the generic feature of the process is the addition of formic aldehyde to a solution of the uric acid.

What we claim, and desire to secure by Letters Patent of the United States, is—

1. The process which consists in causing formic aldehyde to act upon a uric acid combined with an alkali.

2. The process which consists in causing formic aldehyde to act upon a solution of an alkyl-uric acid.

3. The process which consists in dissolving uric acid proper in water and caustic potash and warming, then cooling to room temperature, and adding a concentrated solution of formic aldehyde, the proportions all being substantially as described.

4. The process which consists in dissolving uric acid proper in water and caustic potash in the proportions given, and warming gently, then cooling to room temperature and then adding a concentrated solution of formic aldehyde in the proportions given, then after the lapse of several hours acidulating the solution, and treating with charcoal, and allowing the liquor to stand.

5. As a new chemical compound an oxymethylene-uric acid having the formula hereinbefore stated, which does not melt but decomposes when heated to the higher temperatures stated, which has an acid reaction and is soluble in water and in alkalies, crystallizes in the form of colorless prisms, which yields up formic aldehyde on boiling with water, dilute alkalies and mineral acids and which gives the murexid test with nitric acid or chlorin water.

6. As a new chemical compound, oxymethylene-uric acid, having the formula given above, which is an acid having no melting-point but, when heated above 320°, centigrade, assumes a dark color and decomposes without effervescence, is soluble in water on boiling and in dilute alkalies, gives a strong murexid reaction with nitric acid or chlorin water; crystallizes in colorless prisms, and on protracted boiling with water yields up formic aldehyde.

In testimony whereof we affix our signatures in presence of two witnesses.

FRITZ ACH.
LORENZ ACH.

Witnesses:
GUSTAV HEINRICH,
JACOB ADRIAN.